(12) United States Patent
Otsuka et al.

(10) Patent No.: US 8,931,845 B2
(45) Date of Patent: Jan. 13, 2015

(54) VEHICLE SEAT

(71) Applicant: Toyota Boshoku Kabushiki Kaisha, Aichi-ken (JP)

(72) Inventors: Taiyo Otsuka, Toyota (JP); Tomokazu Igarashi, Miyoshi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 52 days.

(21) Appl. No.: 13/713,255

(22) Filed: Dec. 13, 2012

(65) Prior Publication Data

US 2013/0161991 A1 Jun. 27, 2013

(51) Int. Cl.
B60N 2/02 (2006.01)
B60N 2/14 (2006.01)
B60N 2/06 (2006.01)
B60N 2/07 (2006.01)
B60N 2/08 (2006.01)
B60N 2/12 (2006.01)

(52) U.S. Cl.
CPC ........ B60N 2/14 (2013.01); B60N 2/062 (2013.01); B60N 2/0705 (2013.01); B60N 2/0715 (2013.01); B60N 2/0818 (2013.01); B60N 2/0843 (2013.01); B60N 2/12 (2013.01)
USPC ............... 297/378.1; 297/378.12; 297/354.13

(58) Field of Classification Search
CPC ........ B60N 2/12; B60N 2/366; B60N 2/3011; B60N 2/22; B60N 2/206; B60N 2/3013
USPC .............................. 297/378.1, 378.12, 354.13
See application file for complete search history.

(56) References Cited

U.S. PATENT DOCUMENTS

| | | | | |
|---|---|---|---|---|
| 7,438,354 B2 * | 10/2008 | Moffa et al. | | 297/14 |
| 7,543,891 B2 * | 6/2009 | Chung | | 297/408 |
| 7,878,592 B2 * | 2/2011 | Yamada et al. | | 297/334 |
| 8,141,954 B2 * | 3/2012 | Kumazaki et al. | | 297/341 |
| 2004/0239169 A1 * | 12/2004 | De Nichilo | | 297/378.12 |
| 2006/0208546 A1 * | 9/2006 | Moffa et al. | | 297/232 |
| 2009/0309407 A1 * | 12/2009 | Saito et al. | | 297/411.32 |
| 2010/0133889 A1 * | 6/2010 | Lutzka et al. | | 297/408 |
| 2011/0215627 A1 * | 9/2011 | Wieclawski | | 297/378.12 |

FOREIGN PATENT DOCUMENTS

| | | |
|---|---|---|
| DE | 2356982 | 5/1975 |
| DE | 2441186 | 7/1975 |
| DE | 102008056290 | 5/2010 |
| JP | 2008-80935 | 4/2008 |

OTHER PUBLICATIONS

Germany Office action, dated Aug. 21, 2013 along with an english translation thereof.

* cited by examiner

Primary Examiner — Laurie Cranmer
(74) Attorney, Agent, or Firm — Greenblum & Bernstein, P.L.C.

(57) ABSTRACT

A vehicle seat including: a base member; a rotary member which is connected to the base member by a pin and is configured to be rotatable with respect to the base member; and a spring attached between the base member and the rotary member and urging the rotary member with respect to the base member in a rotating direction, wherein the spring abuts an outer circumference of the pin, and wherein the pin is integrally coupled to the rotary member.

5 Claims, 10 Drawing Sheets

VEHICLE SEAT

CROSS-REFERENCE TO RELATED APPLICATIONS

This application claims priority from Japanese Patent Application No. 2011-279353 filed on Dec. 21, 2011, the entire contents of which are incorporated herein by reference.

TECHNICAL FIELD

The present invention relates to a vehicle seat, and more particularly, to a vehicle seat which has a base member, a rotary member which is connected to the base member by a pin and is configured to be rotatable with respect to the base member, and a spring attached between the base member and the rotary member and urging the rotary member against the base member in a rotating direction.

BACKGROUND

In the related art of vehicle seats, there is known an approach in which a rotary member is rotatably attached to a base member by a pin and is urged in a rotation direction by a spiral spring which is attached between the two members (see, JP-A-2008-80935). Specifically, the spiral spring is configured such that the central wound portion thereof is held by the pin, and one and the other ends thereof are held to the rotary member and the base member, respectively. Consequently, eccentric offset of the spiral spring attributable to twisting and inserting thereof is reduced since the spiral spring is pressed against the pin.

SUMMARY

However, in the related art, since the pin is fixed to the base member which does not rotate, when the rotary member rotates, friction resistance due to sliding is generated between one end of the spiral spring, which moves along with the rotary member and has a great rotational momentum, and the pin. This consequently makes the movement difficult, which is problematic. Accordingly, the present invention has been made in view of the above-described problems occurring in the related art, and an object of the present invention is to reduce sliding friction resistance between the spring which applies rotational urging force to the rotary member and the pin.

In order to solve the above-described problems, a vehicle seat of the present invention is configured in the following manner:

According to an aspect of the present invention, there is provided a vehicle seat including: a base member; a rotary member which is connected to the base member by a pin and is configured to be rotatable with respect to the base member; and a spring attached between the base member and the rotary member and urging the rotary member with respect to the base member in a rotating direction, wherein the spring abuts an outer circumference of the pin, and wherein the pin is integrally coupled to the rotary member.

Accordingly, when the rotary member, which is connected to the base member by the pin, rotates against the urging force of the spring or rotates by the urging force of the spring, the pin also rotates integrally with the rotary member. It is therefore possible to reduce the sliding friction resistance between the spring which moves along with the rotary member and the pin.

DETAILED DESCRIPTION

Embodiments of the present invention will be described hereinafter with reference to the drawings.

Embodiment 1

First, a configuration of a vehicle seat 1 according to embodiment 1 will be described with reference to FIG. 1 to FIG. 10.

Figure 1:
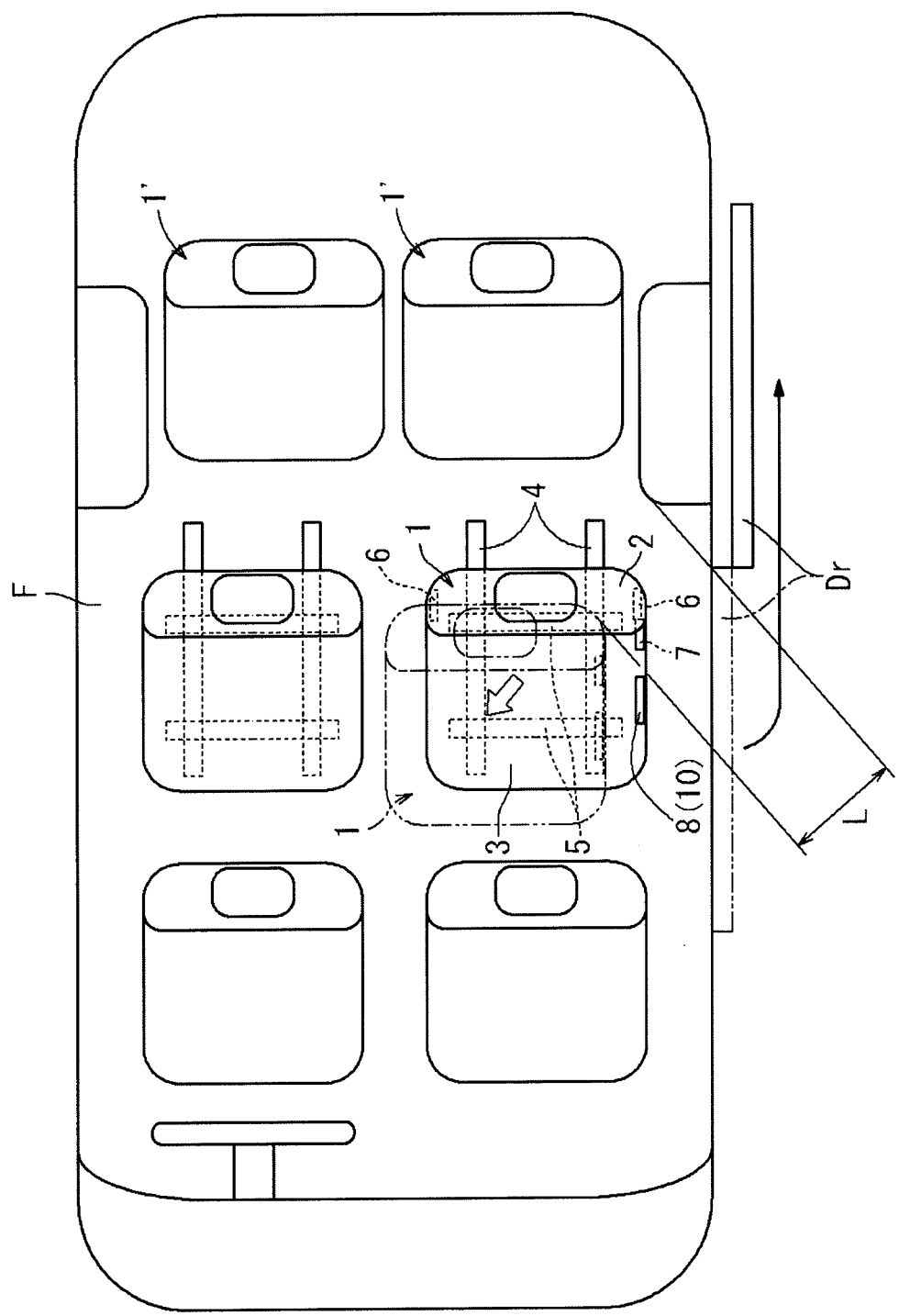
FIG. 1 is a top plan view showing a schematic configuration of a vehicle seat according to embodiment 1.

As shown in FIG. 1, the vehicle seat 1 of this embodiment is configured as a seat in a second row behind a seat next to a driver's seat in a vehicle, which has three rows of seats. The vehicle seat 1 has a seatback 2 which forms the back of the seat and a seat cushion 3 which forms a seating portion. The vehicle seat 1 includes a forward-backward slide mechanism 4 and a lateral slide mechanism 5 between a bottom surface of the seat cushion 3 and a floor surface F of the vehicle, the forward-backward slide mechanism 4 enabling the vehicle seat 1 to slide forward and backward, and the lateral slide mechanism 5 enabling the vehicle seat 1 to slide in the width direction of the vehicle. The forward-backward slide mechanism 4 and the lateral slide mechanism 5 are locked from sliding in the normal state, and their respective slide-locked states are sequentially released when a slide release lever 8 which is provided on a side portion of the seat cushion 3 is manipulated.

Specifically, in the manipulation of the slide release lever 8, first, when the slide release lever 8 is manipulated to an intermediate position, the slide-locked state of the forward-backward slide mechanism 4 is released, so that it can slide the vehicle seat 1 in the forward and backward direction. In sequence, when the slide release lever 8 is further manipulated, the slide-locked state of the lateral slide mechanism 5 is sequentially released, so that it can slide the vehicle seat in the lateral direction. Owing to these manipulations, the vehicle seat 1 can be freely slid forward and backward and to the right and left. It is therefore possible to freely and properly adjust the sliding position of the vehicle seat 1, for example, by causing the vehicle seat 1 to approach the next seat or move away from the front seat. A mechanism of the slide release button 8 will be described in detail later.

Figure 2:
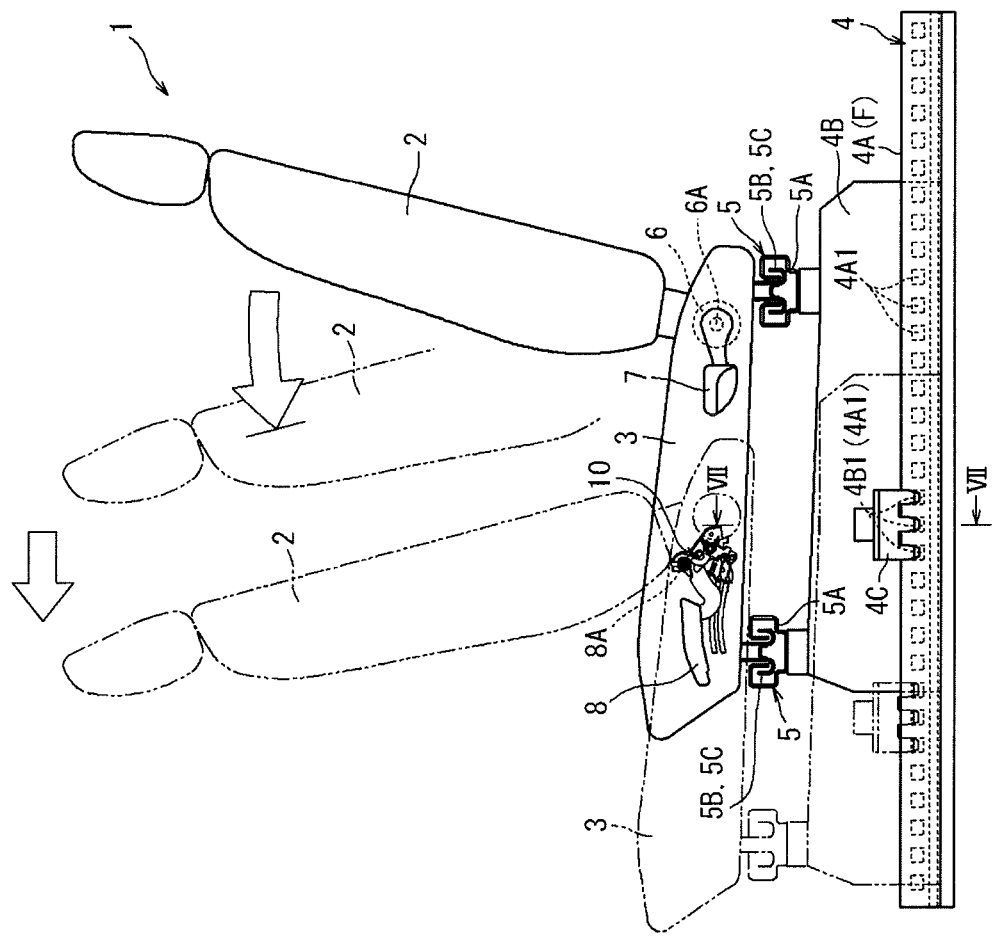
FIG. 2 is a side view showing a state in which a walk-in operation is performed to the vehicle seat.

In addition, as shown in FIG. 2, in the vehicle seat 1, each lower end of left and right side portions of the seatback 2 is connected to a respective rear end of the left and right side portions of the seat cushion 3, with a respective reclining mechanism 6 which will be described later being interposed therebetween. The reclining mechanisms 6 are configured so as to function as a rotary shaft device which can be prevented from rotating. At normal times, the reclining mechanisms 6 are prevented from rotating and the back angle of the back thereof remains fixed. The seatback 2 is configured such that a locked state of the angle of the back thereof fixed by the respective reclining mechanism 6 is released when the reclining release lever 7 provided on the side portion of the seat cushion 3 is manipulated.

Specifically, the respective reclining mechanism 6 has a manipulation shaft 6A which is mounted on the central portion thereof and extends in the axial direction. The manipulation shafts 6A can be manipulated in order to release the locked state (anti-rotation state) of the reclining mechanism 6. The manipulation shafts 6A are connected to each other by a connecting rod (not shown) so as to integrally rotate. When the reclining release lever 7 which is connected to the manipulation shafts 6A is manipulated from outside the vehicle, both the manipulation shafts 6A are manipulated so as to axially rotate altogether, so that the locked state of the respective reclining mechanism 6 is released at the same time. In the meantime, a detailed description of the respective reclining mechanism 6 will be omitted since the basic structure thereof is the same as that disclosed in JP-A-2011-116303 or other documents.

Therefore, when the locked state of the respective reclining mechanism 6 is released by manipulated the reclining release lever 7, the locked state of the angle of the back of the seatback 2 is released. In this state, the angle of the back of the seatback 2 can be adjusted. At normal times, the seatback 2 is urged in the direction in which it rotates and folds forward under the urging force of a spring which is held between the seatback 2 and the seat cushion 3. When the locked state of the angle of the back of the seatback 2 is released, the urging force of the spring causes the seatback 2 to rotate forward to a position where the seatback 2 abuts the back of an occupant who is seated in the vehicle seat. Consequently, the angle of the back is adjusted following the action of the seated occupant, i.e. his/her back is leaned backward or erected forward. In addition, after the angle of the back of the seatback 2 is adjusted, the manipulation of the reclining release lever 7 is stopped and the seatback 2 is fixed to the adjusted angle of the back thereof.

However, when the vehicle seat 1 is not used, i.e. is not seated, the seatback 2 is folded forward and is converted into a forwardly-inclined posture as the reclining release lever 7 is manipulated from the outside of a boarding door Dr outside the vehicle. In cooperation with this operation, the above-described slide-locked state of the forward-backward slide mechanism 4 is converted into a released state. Accordingly, the vehicle seat 1 can be slid and moved aside to the front portion of the vehicle in a compact state in which the seatback 2 is inclined forward. It is therefore possible to a boarding space L into a widely opened state, the boarding space L allowing boarding on a seat 1' in a third row from the boarding door Dr outside the seat.

Detailed descriptions of the configuration of the respective components of the vehicle seat 1 will be given hereinafter. First, a description will be given of the configuration of a release mechanism 10 which sequentially releases the forward-backward slide mechanism 4 and the lateral slide mechanism 5 in response to the manipulation of the slide release lever 8, which was described above with reference to FIG. 1. The slide release lever 8 is axially-connected by a connecting shaft 8A such that it can be manipulated to upwardly rotate with respect to a base plate 11 which is coupled to a side frame of a seat cushion frame 3F outside the vehicle. Specifically, the connecting shaft 8A is integrally coupled to the base plate 11 via welding, and the slide release lever 8 is rotatably connected to the connecting shaft 8A.

Figure 3:
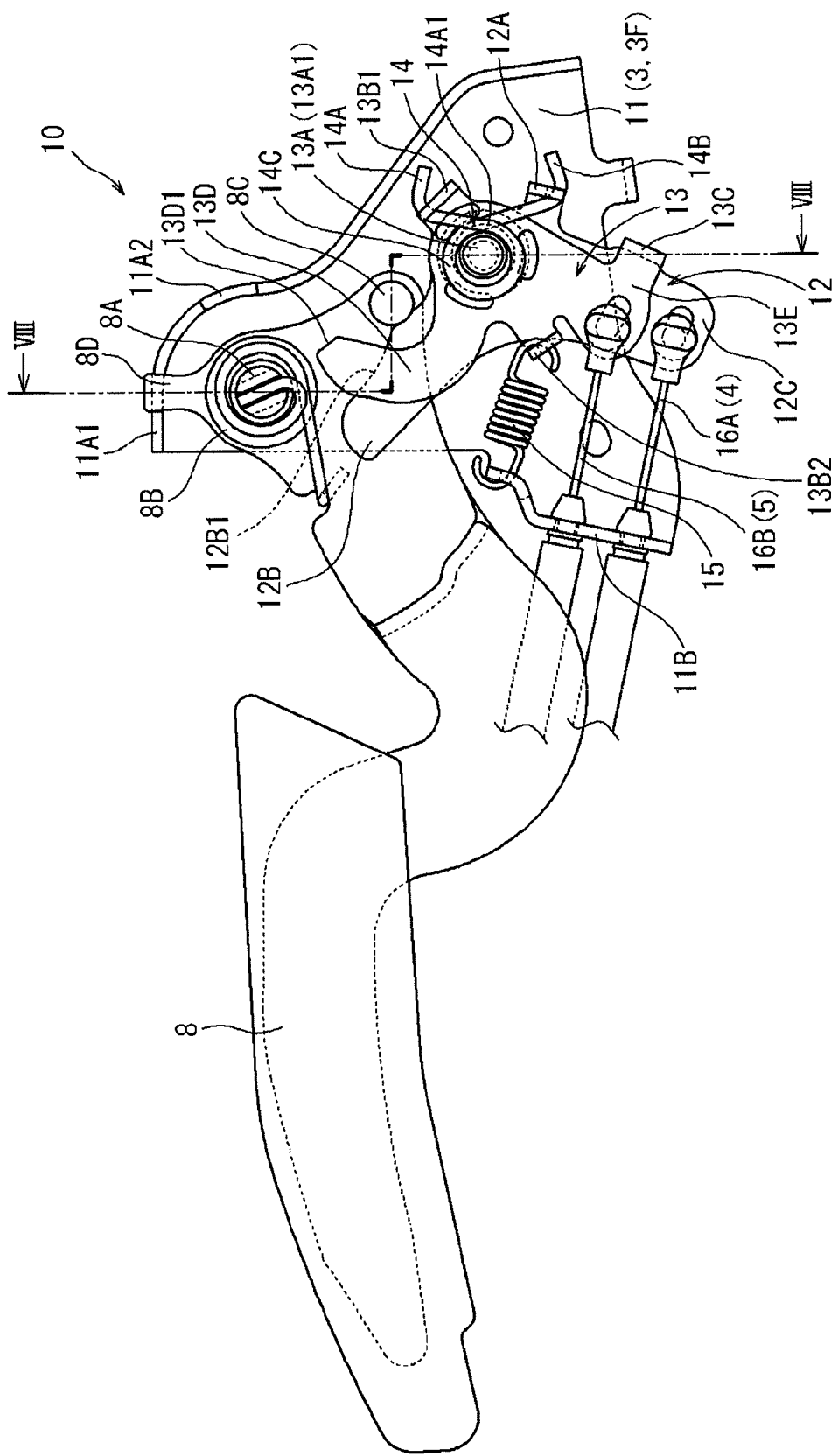
FIG. 3 is an enlarged view showing an initial state of a release mechanism.

As shown in FIG. 3, the slide release lever 8 has a protrusion 8D which protrudes from a portion above the center of rotation (the connecting shaft 8A). The slide release lever 8 is rotatable in the range from a position where the protrusion 8D abuts a bent front stopper 11A1 formed on the upper periphery of the base plate 11 to a position where the protrusion 8D abuts a bent rear stopper 11A2 formed on the upper periphery of the base plate 11. In the slide release lever 8, at normal times, the protrusion 8D is rotated to and is stopped at a position where the protrusion 8D abuts the front stopper 11A1 of the base plate 11 under the urging force of a lever spring 8B which is implemented as a spiral spring attached between the connecting shaft 8A and the protrusion 8D. The release mechanism 10 which will be described later is manipulated by manipulating the slide release lever 8 so as to be pulled upward against the urging force of the lever spring 8B, so that a first cable 16A connected to the forward-backward slide mechanism 4 and a second cable 16B connected to the lateral slide mechanism 5 are sequentially pulled, thereby sequentially releasing the slide-locked states.

Figure 8:
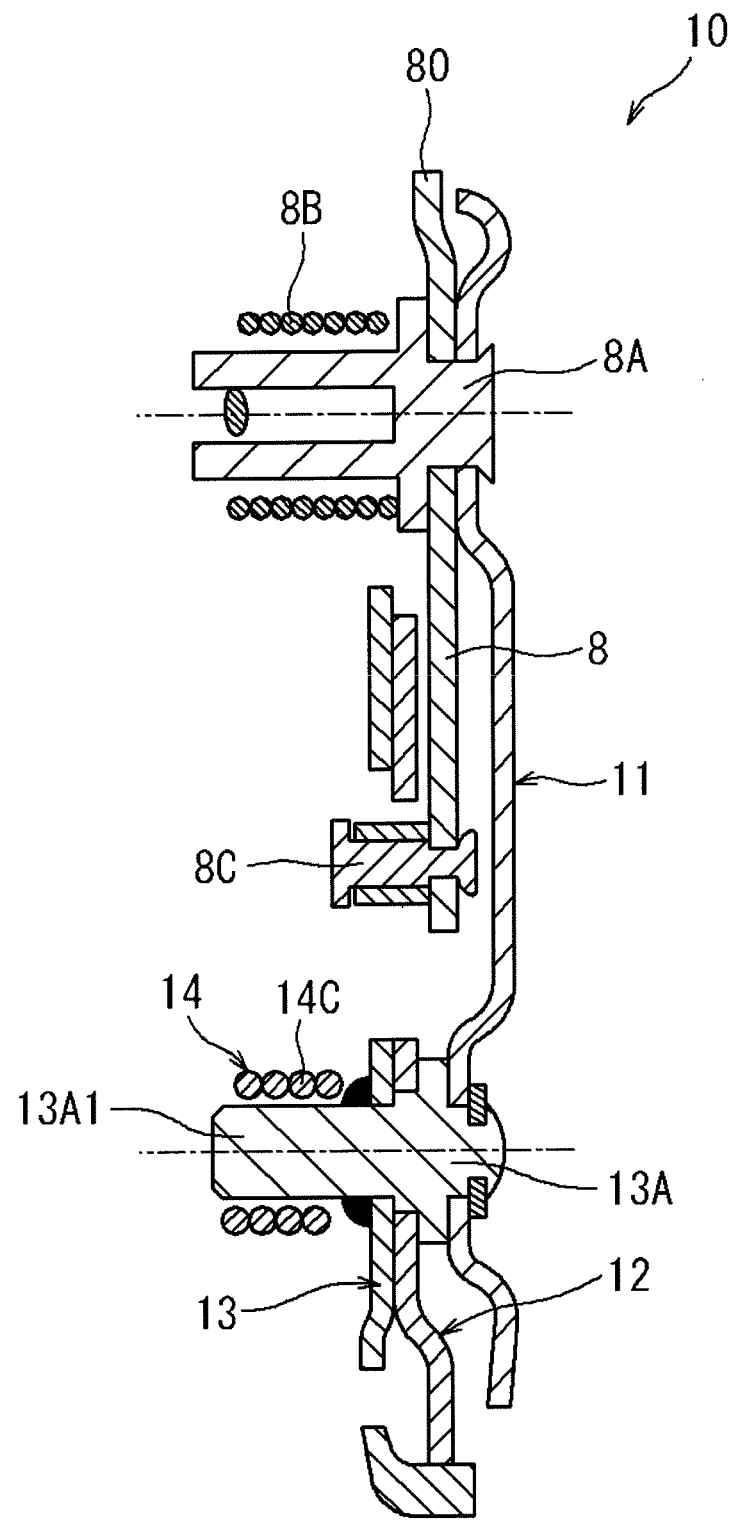
FIG. 8 is a cross-sectional view taken along line VIII-VIII in FIG. 3.

The release mechanism 10 includes a first link 12 and a second link 13 which are axially connected to the base plate 11 by a connecting pin 13A so as to be coaxially rotatable. Here, the first link 12 corresponds to a "base member" of the present invention, and the connecting pin 13A corresponds to a "pin" of the present invention. As shown in FIG. 8, the connecting pin 13A extends through and is inserted into the first link 12 and the base plate 11 in the axial direction, and is rotatably caulked to the base plate 11. A protruding extending portion 13A1 which extends out from the second link 13 is integrally coupled to the second link 13 via welding. Consequently, the first link 12 and the second link 13 are axially connected to each other via the connecting pin 13A so as to be individually rotatable with respect to the base plate 11. Owing to the above-described configuration in which the connecting pin 13A is welded to the second link 13, it is possible to weld these components on a surface of a side in which no other obstructing members such as the base plate 11 are present, thereby enabling a simple coupling operation via welding.

As shown in FIG. 3, at normal times, the rotational-positional relationship between the first link 12 and the second link 13 is maintained constant by the urging force of an interlink spring 14 which is implemented as a spiral spring attached between the links. Here, the interlink spring 14 corresponds to a "spring" of the present invention. Specifically, a central wound portion 14C of the interlink spring 14 is held on the extending portion 13A1 which extends from the second link 13 of the connecting pin 13A. In addition, one end 14A of the interlink spring 14 is held on a first spring-holding piece 13B1 which is formed on an edge of the second link 13 and is bent in an axial direction, and the other end 14B of the interlink spring 14 is held on a spring-holding piece 12A which is formed on an edge of the first link 12 and is bent in an axial direction.

Since the interlink spring 14 is attached as described above, the first link 12 is rotatably urged in the counterclockwise direction in the figure with respect to the second link 13 at normal times, whereas the second link 13 is rotatably urged in the clockwise direction in the figure with respect to the first link 12 at normal times. The rotational-positional relationship of the first and second links 12 and 13 is fixedly maintained at a rotational position where an arm 12C which extends downward of the first link 12 in the figure abuts and is stopped by a stopper piece 13C which is formed on an edge of the second link 13 and is bent in an axial direction.

In addition, both the first link 12 and the second link 13 are rotatably urged in the clockwise direction in the figure at normal times by the urging force of a tension spring 15 which is attached between a second spring-holding piece 13B2 formed on an edge of the second link 13 and a holding plate 11B formed on the base plate 11. An arm 12B which extends upward of the first link 12 in the figure is maintained at a rotational position where the arm 12B abuts and is stopped by a pushpin 8C which is provided on the slide release lever 8. Here, an arm 13D which extends upward of the second link 13 in the figure is spaced apart from the pushpin 8C of the slide release lever 8 in the counterclockwise direction in the figure.

One end of the first cable 16A which is connected to the forward-backward slide mechanism 4 is held on the arm 12C which extends downward of the first link 12 in the figure. Accordingly, the first link 12 is manipulated by the pushpin 8C so as to rotate from the above-described initial state in the counterclockwise direction in the figure, in response to the manipulation of the slide release lever 8. This manipulation causes the first cable 16A to be pulled so that the slide-locked state of the forward-backward slide mechanism 4 is released (see FIG. 4). In addition, one end of the second cable 16B which is connected to the lateral slide mechanism 5 is held on an arm 13E which extends downward of the second link 13 in the figure. Accordingly, the second link 13 is manipulated by the pushpin 8C so as to rotate from the above-described initial state in the counterclockwise direction in the figure, in response to the manipulation of the slide release lever 8. This manipulation causes the second cable 16B to be pulled so that the slide-locked state of the lateral slide mechanism 5 is released (see FIG. 5).

Each of the first cable 16A and the second cable 16B has a dual structure in which a linear member is inserted into a tubular member. One end of the tubular member is held and fixed by the holding plate 11B of the base plate 11, and one end of the inside linear member is held by the first link 12 or the second link 13. Accordingly, in response to a movement manipulation in which the first link 12 or the second link 13 rotates in the counterclockwise direction, the first cable 16A or the second cable 16B is pulled so that the linear member is pulled out from one end of the tubular member and the amount of the movement is transferred to the other side. A position where one end of the first cable 16A is held by the arm 12C which extends downward of the first link 12 is set to a position which is spaced in the radially outward direction for a longer distance than a position where one end of the second cable 16B is held by the arm 13E which extends downward of the second link 13. In addition, the positional relationship in the circumferential direction is set to substantially the same position.

Next, with reference to FIG. 3 to FIG. 6, a description will be given below of a configuration in which the respective slide-locked state of the forward-backward slide mechanism 4 and the lateral slide mechanism 5 is released by manipulating the slide release lever 8. As shown in FIG. 3, in the initial state before the slide release lever 8 is manipulated to move upward, the outer circumferential surface (the upper surface in the figure) of the arm 12B of the first link 12 remains pressed against the pushpin 8C provided on the slide release lever 8. When the slide release lever 8 is manipulated to move upward from this state, as shown in FIG. 8, the first link 12 is rotated in the counterclockwise direction in the figure by the pushpin 8C and, at the same time, the second link 13 rotates following the first link 12 as the stopper piece 13C thereof is pushed by the first link 12.

Accordingly, both the links 12 and 13 are manipulated to rotate together. However, even though both the links 12 and 13 rotate together as described above, the first cable 16A side which is held on the first link 12 is pulled more than the second cable 16B side which is held on the second link 13, since a position where the first cable 16A is held is outside a position where the second cable 16B is held. Thus, in response to the manipulation, the first cable 16A is pulled to a position where the slide-locked state of the forward-backward slide mechanism 4 can be released before the second cable 16B, so that the slide-locked state of the forward-backward slide mechanism is released first.

Figure 5:
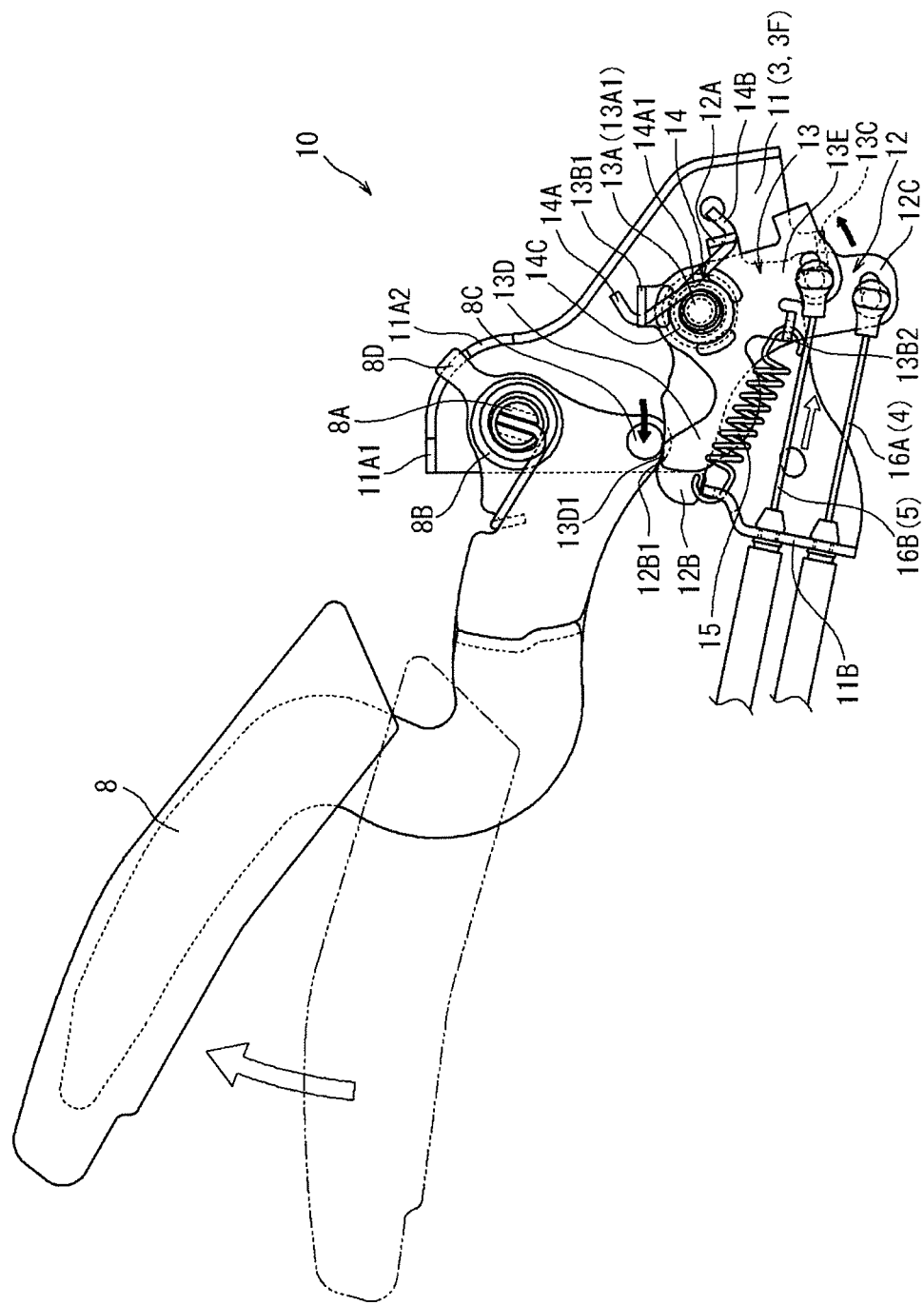
FIG. 5 is an enlarged view showing a state in which a lateral side mechanism is also released from locking as the slide release lever is further manipulated.
Figure 6:
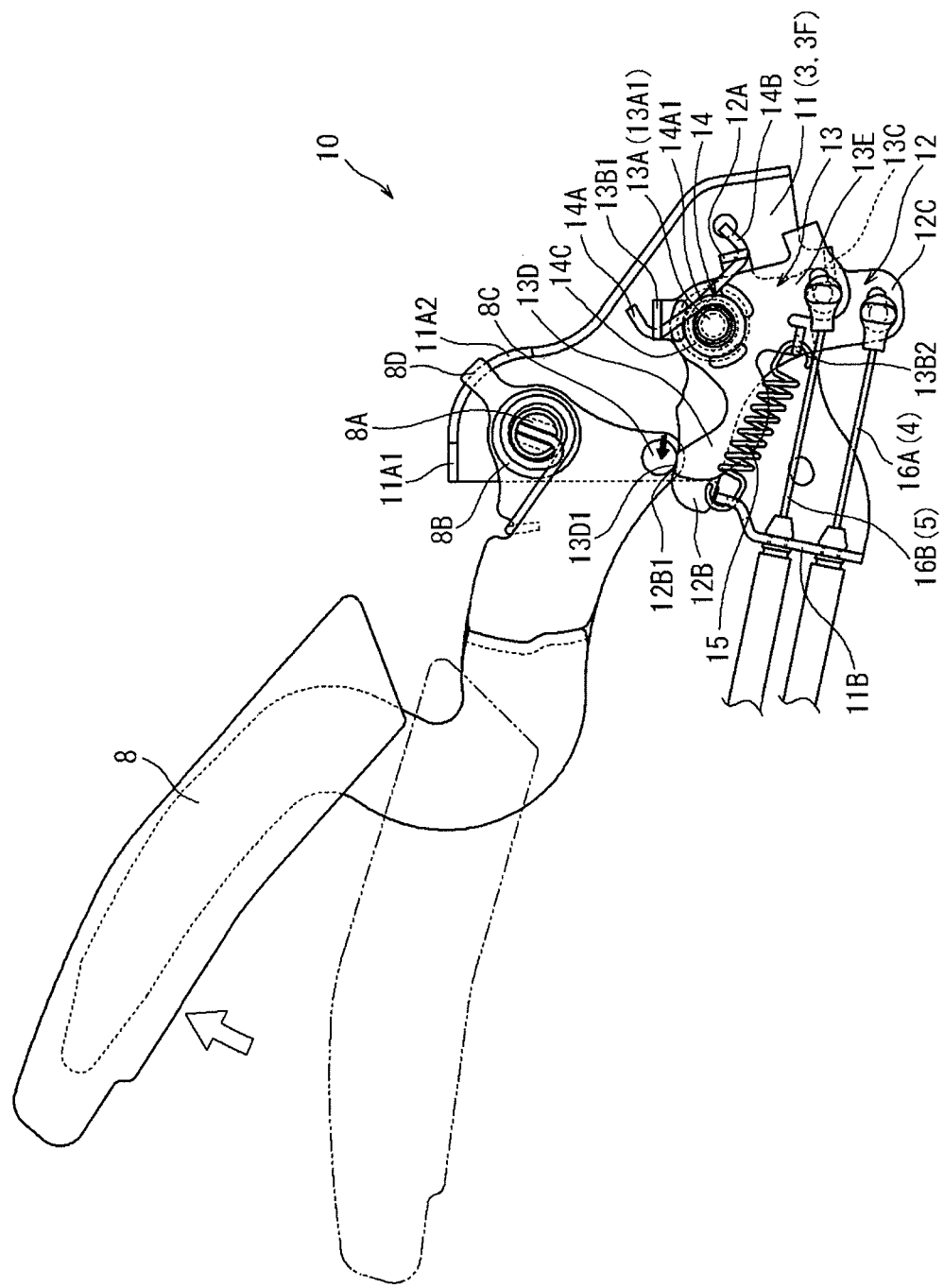
FIG. 6 is an enlarged view showing a state in which the slide release lever has been manipulated to the maximum position.

In sequence, when the slide release lever 8 is manipulated to move further upward from that manipulation position, the pushpin 8C of the slide release lever 8 climbs over a circular arc surface 12B1 which is formed on the outer circumference of the arm 12B of the first link 12. Here, since the first link 12 is rotated to a position where the push pin 8C climbs over the circular arc surface 12B1, the circular arc surface 12B1 is curved so as to form an arc of a circle which is drawn around the center of rotation of the slide release lever 8 (the connecting shaft 8A). Thus, as shown in FIG. 5 and FIG. 6, in the rotating manipulation after the pushpin 8C has climbed over the circular arc surface 12B1 of the first link 12 in response to the manipulation of moving the slide release lever 8 upward, even though the slide release lever 8 is manipulated to move upward, the first link 12 does not rotate further, and the first cable 16A is not pulled further beyond a predetermined distance. Accordingly, even though the manipulation of pulling the slide release lever 8 is performed to the limit position, excessive load is not applied to the first cable 16A.

Figure 4:
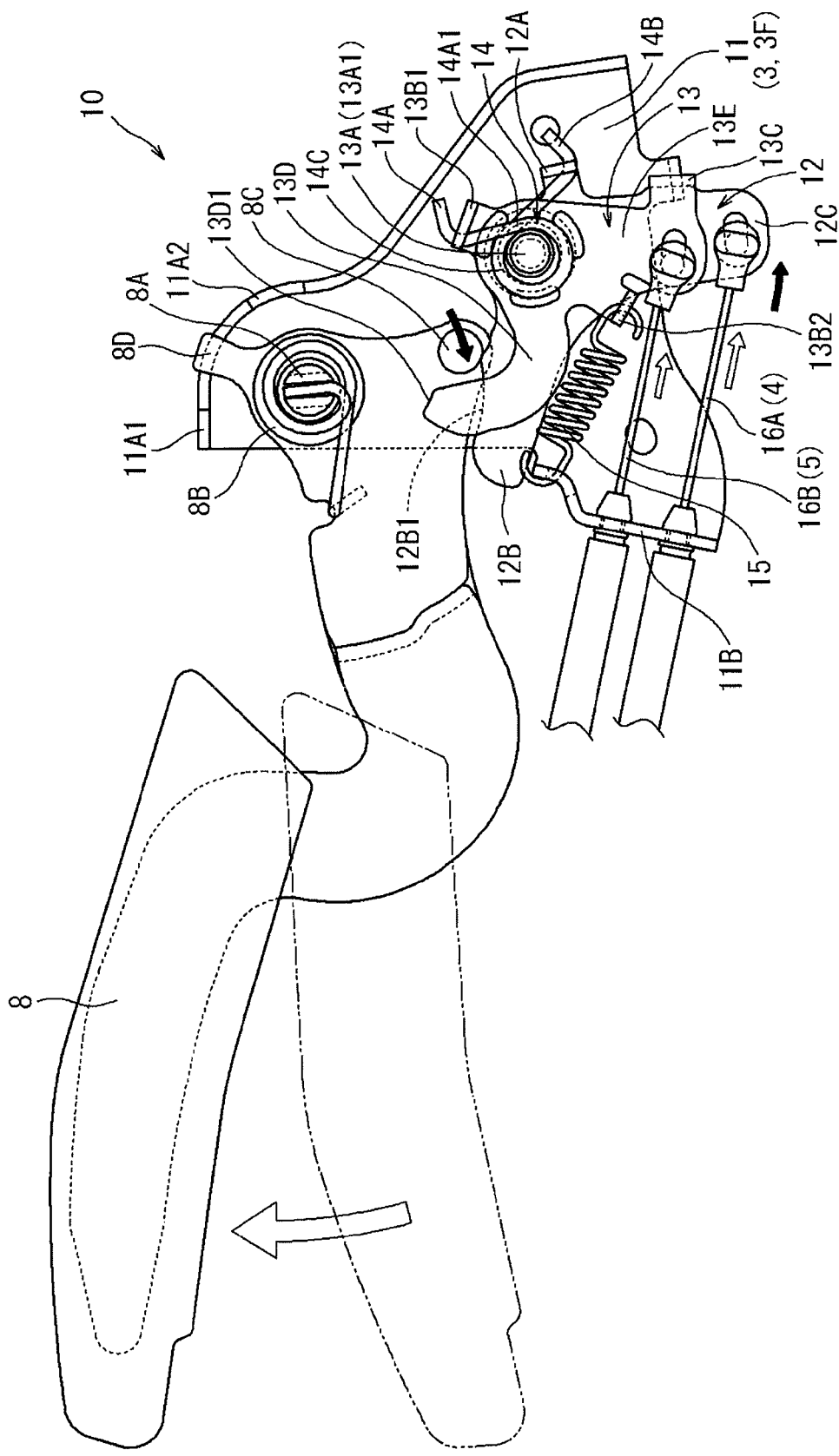
FIG. 4 is an enlarged view showing a state in which a forward-backward slide mechanism is released from locking as a slide release lever is manipulated.

In addition, as shown in FIG. 4, when the pushpin 8C climbs over the circular arc surface 12B1 of the first link 12 in response to the above-described manipulation of moving the slide release lever 8 upward, the first link 12 never or rarely rotates even though the manipulation of moving the slide release lever 8 upward is performed. Accordingly, a manipulation force necessary for pulling the slide release lever 8 upward is reduced first. However, afterwards, as the slide release lever 8 is further manipulated, the pushpin 8C is pressed against the outer circumference of the arm 13D of the second link 13. Since the outer circumference of the arm 13D is erected and oriented in the shape of a wall with respect to the pushpin 8C, the manipulation force of the slide release lever 8 for rotating the arm 13D is sharply increased again.

Accordingly, when the manipulation is stopped at a position where the force of manipulating the slide release lever 8 rapidly increases, only the slide-locked state of the forward-backward slide mechanism 4 can be released, thereby maintaining the vehicle seat 1 in the state in which it can slide only in the forward and backward direction. That is, while the slide release lever 8 is being manipulated, a sudden resistance is added to a sense of manipulation so that a sense of moderation is provided. This consequently enables a user to stop the manipulation at an intermediate position of the operation. In addition, it is possible to release only the forward-backward slide mechanism 4 by the manipulation of moving one slide release lever 8, or the lateral slide mechanism 5 can also be released by further manipulating the slide release lever 8 as will be described later. In this way, the manipulation can be carried out easily.

When the pushpin 8C is manipulated further using the slide release lever 8 so that the pushpin 8C moves upward further from the state in which the pushpin 8C abuts the arm 13D of the second link 13, the second link 13 is pushed in the counterclockwise direction in the figure directly by the pushpin 8C so as to rotate alone (see FIG. 5). Consequently, only the second cable 16B which is connected to the arm 13E of the second link 13 is manipulated so as to be pulled to a greater distance, and the slide-locked state of the lateral slide mechanism 5 is released. In the meantime, as shown in FIG. 6, although it is possible to carry out the manipulation of moving the slide release lever 8 upward by rotating the second link 13 to a position where the slide-locked state of the lateral slide mechanism 5 is released and then to a position where the protrusion 8D abuts and is stopped by the rear stopper 11A2 of the base plate 11, after the second link 13 has rotated to the position where the slide-locked state of the lateral slide mechanism 5 is released, the pushpin 8C climbs over the circular arc surface 13D1 formed on the upper surface of the arm 13D of the second link 13.

The circular arc surface 13D1 is also curved such that the second link 13 rotates up to a position where the pushpin 8C climbs over the circular arc surface 13D1 so that the surface thereof forms the shape of an arc of a circle that is drawn around the center of rotation of the slide release lever 8 (connecting shaft 8A). Therefore, as shown in FIG. 6, in the rotating manipulation after the pushpin 8C has climbed over the circular arc surface 13D1 of the second link 13 in response to the manipulation of moving the slide release lever 8 upward, even though the manipulation of moving the slide release lever 8 upward is performed, the second link 13 does not rotate further and the second cable 16B is not pulled further beyond a predetermined distance. Accordingly, even though the manipulation of pulling the slide release lever 8 is performed to the limit position, excessive load is not applied to the second cable 16B.

In the above-described configuration, when the slide release lever 8 is manipulated to move upward, the slide-locked state of the forward-backward slide mechanism 4 is released first, and then the slide-locked state of the lateral slide mechanism 5 is released. When the manipulation of moving the slide release lever 8 upward is released after the manipulation has been carried out, the second link 13 returns to the initial rotational-positional relationship with respect to the first link 12 by the urging force of the interlink spring 14. In addition, the rotational position of the second link 13 with respect to the base plate 11 returns to the initial rotational position shown in FIG. 3 by the urging force of the tension spring 15.

Here, in the interlink spring 14 which is implemented as a spiral spring attached between the first link 12 and the second link 13 as described above, the central wound portion 14C thereof is held on the extending portion 13A1 of the connecting pin 13A. Thus, the eccentric offset of the wound portion 14C which is caused by twisting between one end 14A and the other end 14B of the interlink spring 14 is restrained because the wound portion 14C is pressed by the extending portion 13A1 of the connecting pin 13A. Accordingly, it is regarded that, as shown in FIG. 5, when a relative rotational displacement occurs between the first link 12 and the second link 13, there may be a relative sliding friction between the interlink spring 14 and the connecting pin 13A, thereby making a movement between the two links 12 and 13 difficult.

However, in the configuration of this embodiment, as shown in FIG. 8, the wound portion 14C of the interlink spring 14 is pressed against and held on the extending portion 13A1 of the connecting pin 13A which is integrally coupled to the second link 13, and one end 14A of the interlink spring 14 is held on the second link 13 which rotates integrally with the connecting pin 13A (see FIG. 3). Consequently, when the second link 13 rotates with respect to the first link 12 against or by the urging force of the interlink spring 14, most of the wound portion 14C of the interlink spring 14 which is pressed against the connecting pin 13A rotates integrally with the connecting pin 13A. Accordingly, sliding friction resistance between the connecting pin 13A and the interlink spring 14 becomes difficult to be generated.

Describing in more detail, the interlink spring 14 is provided with a joint 14A1 which connects one end 14A held on the second link 13 and the wound portion 14C, the joint 14A1 abutting the outer circumference of the extending portion 13A1 of the connecting pin 13A. The joint 14A1 is configured so as to have a large rotational momentum such that it moves together with the second link 13 when the second link 13 rotates and moves with respect to the first link 12. However, when the joint 14A1 rotates, the connecting pin 13A which abuts the joint 14A1 also rotates. Accordingly, sliding friction resistance between the joint 14A1 and the connecting pin 13A becomes difficult to be generated. Owing to the above-described configuration, the sliding friction resistance between the interlink spring 14 and the connecting pin 13A when the second link 13 rotates and moves with respect to the first link 12 is reduced. Therefore, when rotating and moving the second link 13 against or by the urging force of the interlink spring 14, the second link 13 can rotate and move smoothly.

Figure 9:
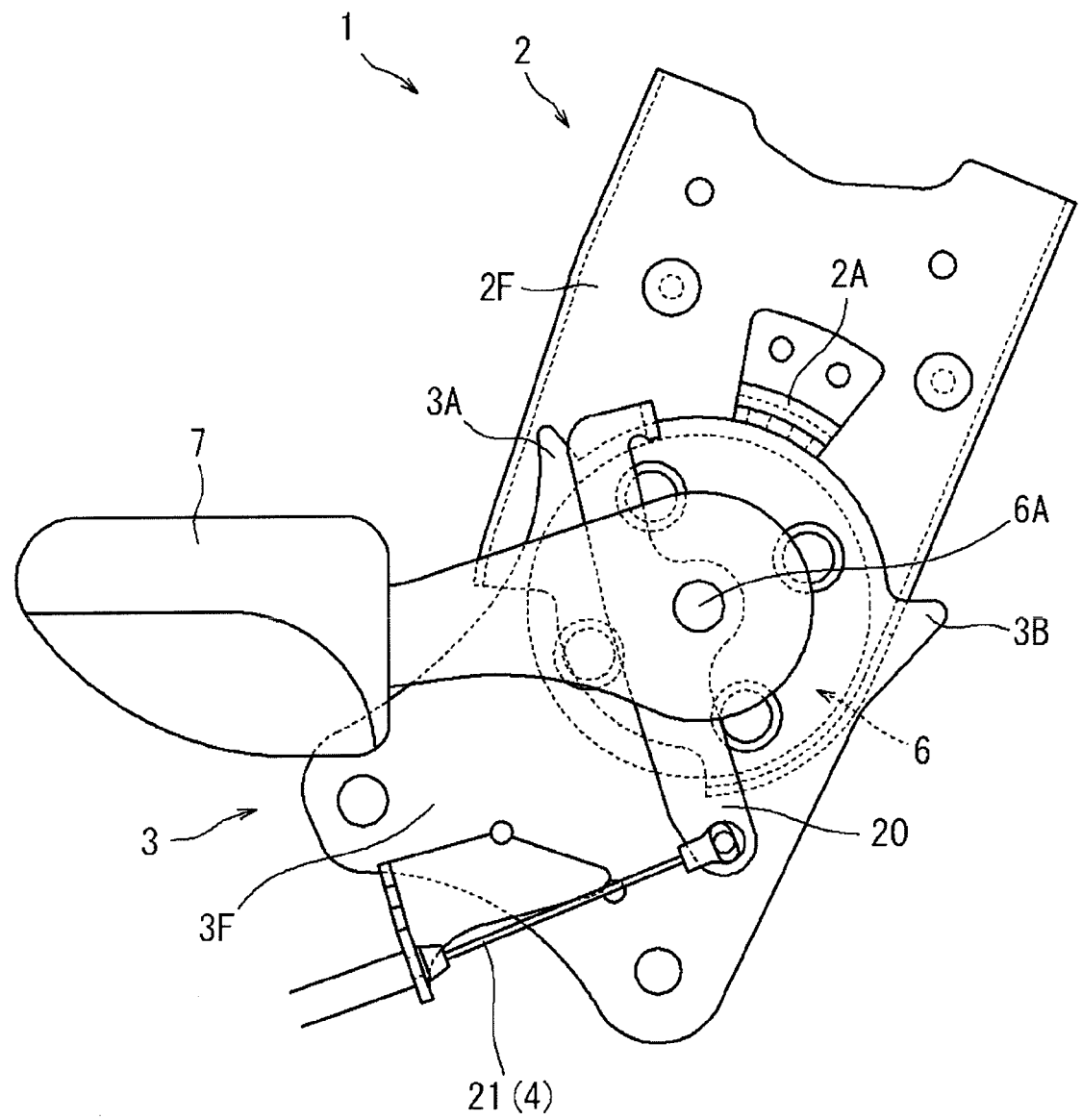
FIG. 9 is a side view showing a state in which the seatback is erected and set to a use position.
Figure 10:
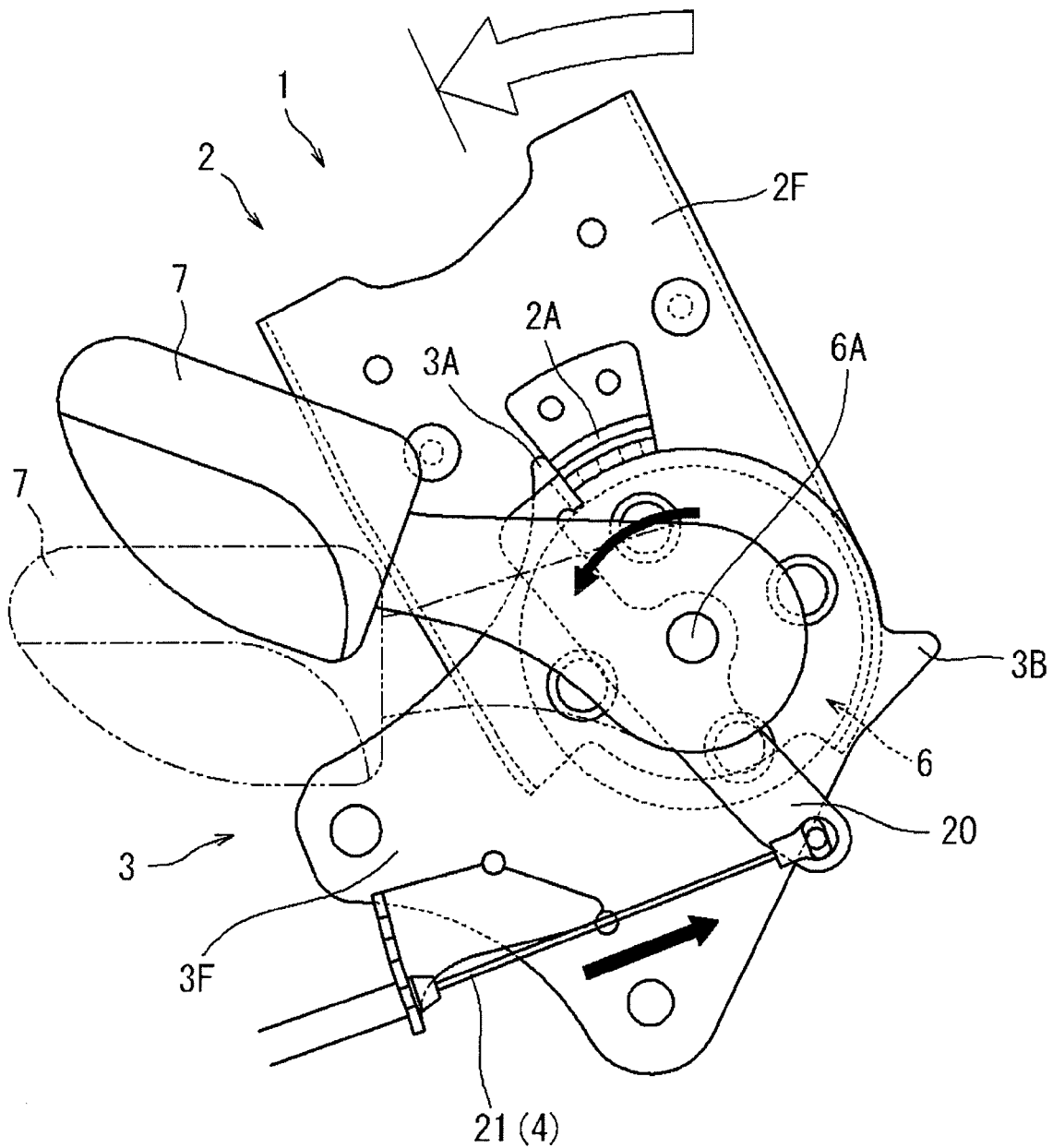
FIG. 10 is a side view showing a state in which a release cable is tensioned due to forward folding of the seatback.

Hereinafter, with reference to FIG. 2, FIG. 9 and FIG. 10, a description will be given of the configuration of a mechanism which is manipulated to release the slide-locked state of the forward-backward slide mechanism 4 in cooperation with the manipulation of folding the seatback 2 forward. As described above with reference to FIG. 2, when the seatback 2 is folded forward by manipulating the reclining release lever 7, the following operation is carried out between inside the seatback 2 and inside the seat cushion 3. That is, as shown in FIG. 9, in the seatback 2, the L-shaped stopper plate 2A which is coupled to both side frames of the seatback frame 2F which forms the skeleton of the seatback can rotate forward and backward in the range from a position where the stopper plate 2A abuts a protrusion-shaped front stopper 3A which is formed on one side frame of the seat cushion frame 3F to a position where the stopper plate 2A abuts a protrusion-shaped rear stopper 3B which is formed on the other side frame of the seat cushion frame 3F. In addition, a release link 20 having the shape of a straight rod is provided on the manipulation shaft 6A of the reclining mechanism 6, which protrudes outward from the side frame of the seat cushion frame 3F at an outer side the vehicle. The release link 20 is rotatably and axially connected to the manipulation shaft 6A.

One end of the release link 20 which extends downward in the figure holds one end of a release cable 21 which is connected to the forward-backward slide mechanism 4. At normal times, the other end of the release link 20 which extends upward in the figure protrudes on a path of movement in the direction of forward rotation of the stopper plate 2A. As shown in FIG. 10, when the seatback 2 is folded forward in response to the manipulation of the reclining release lever 7, the release link 20 is pushed and moved forward by the stopper plate 2A so as to rotate in the counterclockwise direction in the figure, thereby pulling the release cable 21. Accordingly, the slide-locked state of the forward-backward slide mechanism 4 is released.

The above-described forward folding rotation of the seatback 2 which has been folded forward is stopped at a position where the stopper plate 2A abuts the front stopper 3A. Consequently, the seatback 2 remains in the folded state to a position where it takes a forwardly-inclined posture, and the forward-backward slide mechanism 4 remains in the state in which slide locking thereof is released. Accordingly, in this state, the vehicle seat 1 can be slid and moved aside to the front portion of the vehicle in a compact state in which the seatback 2 is inclined forward.

Next, with reference to FIG. 1, FIG. 2 and FIG. 7, a description will be given of the respective configuration of the forward-backward slide mechanism 4 and the lateral slide mechanism 5 as described above. As shown in FIG. 1 and FIG. 2, a pair of left and right forward-backward slide mechanisms 4 are provided on the floor surface F below the seat cushion, and a pair of front and rear lateral slide mechanisms 5 are disposed above on the upper surface of the pair of left and right forward-backward slide mechanisms 4 to be arranged in parallel crosses. The respective forward-backward slide mechanism 4 has a lower rail 4A which is fixed on the floor surface F of the vehicle and extends in the shape of a long ruler in the forward and backward direction, an upper rail 4B which is mounted so as to be slidable forward and backward with respect to the lower rail 4A, and lock claws 4C which lock the upper rail 4B so as not to slide.

In addition, the respective lateral slide mechanism 5 has a lower rail 5A which extends in the shape of a long ruler in the width direction of the vehicle, an upper rail 5B which is mounted so as to be slidable in the width direction of the vehicle with respect to the lower rail 5A, and lock claws 5C which locks the upper rail 5B so as not to slide. The lower rail 5A of the respective lateral slide mechanism 5 bridges the upper rails 4B of the forward-backward slide mechanism 4 and is integrally coupled and fixed to the upper rails 4B. The upper rail 5B of the respective lateral slide mechanism 5 is integrally coupled and fixed to the undersurface of the seat cushion 3.

Hereinafter, a description will be given of respective slide lock structures of the forward-backward slide mechanism 4 and the lateral slide mechanism 5 as described above. Since these slide lock structures have the same basic configuration, in the following, common components will be described together by adding the signs of the components of the lateral slide mechanism 5 which correspond to the components of the forward-backward slide mechanism 4 in brackets while the corresponding components of the forward-backward slide mechanism 4 are described. As shown in FIG. 7, the lock claws 4C (5C) are provided on the upper rail 4B (5B) of the forward-backward slide mechanism 4 (lateral slide mechanism 5), and is rotatably and axially connected by a support shaft 4C1 (5C1).

The lock claws 4C (5C) include three claws which are formed on the leading end and protrude at the same intervals. At normal times, respective claws at the leading end thereof extend through three equally-spaced lock-holes 4B1 (5B1) which are formed in the upper rail 4B (5B) from inside the upper rail 4B (5B) and are inserted into three equally-spaced lock-holes 4A1 (5A1) which are formed in the lower rail 4A (5A) in the same fashion.

Accordingly, at normal times, the upper rail 4B (5B) remains locked so as not to slide with respect to the lower rail 4A (5A).

The lock claws 4C (5C) which are inserted into the lock-holes 4B1 (5B1) of the upper rail 4B (5B) and the lock-holes 4A1 (5A1) of the lower rail 4A (5A) is taken out as the lock claws 4C (5C) are manipulated to rotate against the urging force of the spring 4C2 (5C2) (the state of imaginary lines in the same figure). Consequently, the slide-locked state of the upper rail 4B (5B) with respect to the lower rail 4A (5A) is released. The manipulation of rotating the lock claws 4C (5C) against the urging force of the spring 4C2 (5C2) is carried out by the manipulation of the slide release lever 8 which was described above with reference to FIG. 3 to FIG. 6 or the folding and rotation of the seatback 2 following the manipulation of the reclining release lever 7 which was described with reference to FIG. 9 and FIG. 10.

Figure 7:
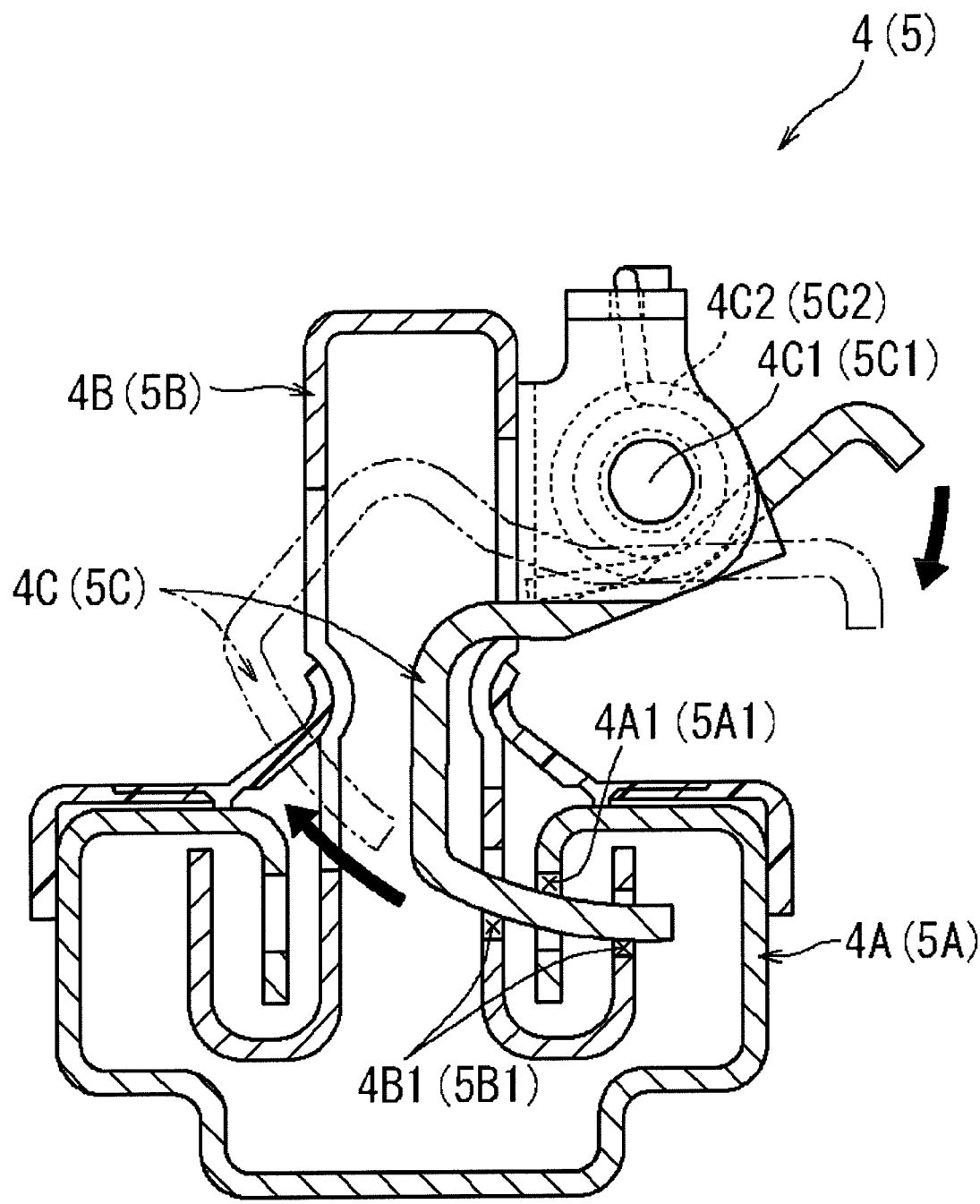
FIG. 7 is a cross-sectional view taken along line VII-VII in FIG. 2.

With reference to FIG. 7, when the rotating manipulation of the lock claws 4C (5C) are released after the upper rail 4B (5B) the slide-locked state of which is released is slid, the lock claws 4C (5C) enter again the lock-holes 4B1 (5B1) of the upper rail 4B (5B) under the urging force of the spring 4C2 (5C2). Here, since the lock claws 4C (5C) formed on the lower rail 4A (5A) are formed at equal intervals in the lengthwise direction of the lower rail 4A (5A), the position at which the upper rail 4B (5B) slides becomes a sliding position where the lock-holes 4B1 (5B1) of the upper rail 4B (5B) are connected to the lock-holes 4A1 (5A1) of the lower rail 4A (5A). Accordingly, the lock claws 4C (5C) return to the state in which they also enter the lock-holes 4A1 (5A1) of the lower rail 4A (5A) and lock the upper rail 4B (5B) so as not to slide.

While the present invention has been described with reference to one embodiment, the present invention can be embodied in various forms other than the foregoing embodiment. For example, the spring in the present invention can be any types of springs such as a tension spring or a compressive spring other than the spiral spring. In addition, the rotary member in the present invention may not be used as the manipulation member as described in the foregoing embodiment with which the slide-locked state of slide mechanism (lateral slide mechanism 5) is released. The rotary member only needs to be configured such that it is urged in a rotating direction with respect to the base member by the urging force of the spring.

The present invention provides illustrative, non-limiting aspects as follows:

(1) In a first aspect, there is provided a vehicle seat including: a base member; a rotary member which is connected to the base member by a pin and is configured to be rotatable with respect to the base member; and a spring attached between the base member and the rotary member and urging the rotary member with respect to the base member in a rotating direction, wherein the spring abuts an outer circumference of the pin, and wherein the pin is integrally coupled to the rotary member.

Accordingly to the first aspect, when the rotary member, which is connected to the base member by the pin, rotates against the urging force of the spring or rotates by the urging force of the spring, the pin also rotates integrally with the rotary member. It is therefore possible to reduce the sliding friction resistance between the spring which moves along with the rotary member and the pin.

(2) In the second aspect, there is provided the vehicle seat according to the first aspect, wherein the spring is a spiral spring having a central wound portion being held on the pin, and the spiral spring is configured to be pressed against the outer circumference of the pin by being eccentrically offset by twisting.

According to the second aspect, when the rotary member rotates, most of the wound portion of the spiral spring which is pressed against the pin rotates integrally with the pin. It is therefore possible to reduce the sliding friction resistance between the spring and the pin.

(3) In the third aspect, there is provided the vehicle seat according to the first or second aspect, wherein the rotary member includes a manipulation member by which a predetermined mechanism is manipulated.

According to the third aspect, the configuration of the rotary member which is not difficult to move when rotating is used as the manipulation member. It is therefore possible to manipulate the manipulation member by using a small amount of force and efficiently carry out the movement of returning the manipulation member by the urging force of the spring.

(4) In the fourth aspect, there is provided the vehicle seat according to any one of the first to third aspects, wherein the pin extends through the rotary member in an axial direction from a portion of the rotary member connected to the base member, the spring abuts an extending portion of the pin which extends out from the rotary member, and the extending portion of the pin is integrally coupled to the rotary member.

According to the fourth aspect, it is possible to carry out the coupling of the pin and the rotary member integrally with each other on a surface of the rotary member at the side which does not interfere with the base member. It is therefore possible to simply perform the coupling using a welding means or the like.

(5) In the fifth aspect, there is provided the vehicle seat according to the first aspect, wherein one end of the spring is held on the base member and the other end of the spring is held on the rotary member.

(6) In the sixth aspect, there is provided the vehicle seat according to the first aspect, wherein the pin is integrally coupled to the rotary member by welding.

What is claimed is:

1. A vehicle seat comprising:
   a base member;
   a rotary member which is connected to the base member by a pin and is configured to be rotatable with respect to the base member; and
   a coil spring attached between the base member and the rotary member and urging the rotary member with respect to the base member in a rotating direction,
   wherein the spring has a central wound portion being held on the pin,
   wherein the spring is configured to be pressed against the outer circumference of the pin by being eccentrically offset by twisting,
   wherein the spring abuts an outer circumference of the pin, and
   wherein the pin is integrally coupled to the rotary member.

2. The vehicle seat according to claim 1,
   wherein the rotary member includes a manipulation member by which a predetermined mechanism is manipulated.

3. The vehicle seat according to claim 1,
   wherein the pin extends through the rotary member in an axial direction from a portion of the rotary member connected to the base member, the spring abuts an extending portion of the pin which extends out from the rotary member, and the extending portion of the pin is integrally coupled to the rotary member.

4. The vehicle seat according to claim 1,
   wherein one end of the spring is held on the base member and the other end of the spring is held on the rotary member.

5. The vehicle seat according to claim 1,
   wherein the pin is integrally coupled to the rotary member by welding.

* * * * *